United States Patent
Locker et al.

(10) Patent No.: US 9,420,630 B2
(45) Date of Patent: Aug. 16, 2016

(54) INTELLIGENT MESH OBJECT LIST BUILDUP

(71) Applicant: Lenovo (Singapore) Pte. Ltd., Singapore (SG)

(72) Inventors: Howard Locker, Cary, NC (US); Daryl Cromer, Cary, NC (US); Richard Wayne Cheston, Pittsboro, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 240 days.

(21) Appl. No.: 14/067,268

(22) Filed: Oct. 30, 2013

(65) Prior Publication Data

US 2015/0117419 A1  Apr. 30, 2015

(51) Int. Cl.
*H04L 29/08* (2006.01)
*H04W 84/18* (2009.01)
*H04W 48/18* (2009.01)
*H04W 72/02* (2009.01)
*H04W 48/16* (2009.01)
*H04W 76/02* (2009.01)

(52) U.S. Cl.
CPC ......... *H04W 84/18* (2013.01); *H04L 29/08306* (2013.01); *H04W 48/16* (2013.01); *H04W 76/02* (2013.01)

(58) Field of Classification Search
None
See application file for complete search history.

(56) References Cited

U.S. PATENT DOCUMENTS

| | | | |
|---|---|---|---|
| 7,299,222 B1 * | 11/2007 | Hogan | G06F 17/30864 |
| 2003/0028585 A1 * | 2/2003 | Yeager | G06F 9/4416 709/201 |
| 2004/0162871 A1 * | 8/2004 | Pabla | H04W 8/005 709/201 |
| 2007/0180078 A1 * | 8/2007 | Murphy | H04L 63/123 709/223 |
| 2009/0006256 A1 * | 1/2009 | Lazovsky | G06F 21/10 705/57 |
| 2009/0210545 A1 * | 8/2009 | Wright | H04L 67/104 709/230 |
| 2011/0208822 A1 | 8/2011 | Rathod | |

* cited by examiner

*Primary Examiner* — Christopher Crutchfield
(74) *Attorney, Agent, or Firm* — Ference & Associates LLC

(57) ABSTRACT

An embodiment provides a method, including: establishing a connection between a first device and a second device, the first device thereby joining a mesh network to which the second device is connected; obtaining, at the first device, identifying information for a plurality of devices of the mesh network; accessing information accessible to the first device to determine a device ranking among the plurality of devices of the mesh network; after determining a ranking, obtaining information from a ranked device regarding objects available from the ranked device; and creating, using a processor, a list of available objects on the mesh network; wherein the list of available objects is ordered taking into account the objects available from the ranked devices. Other aspects are described and claimed.

29 Claims, 4 Drawing Sheets

INTELLIGENT MESH OBJECT LIST BUILDUP

BACKGROUND

Information handling devices ("devices"), for example laptop computers, tablets, smart phones, e-readers, etc., may be used to interact with other devices. Mobile devices commonly share information over some type of network connection. Wireless mesh networks may be used in this regard.

Wireless mesh networks provide a distributed connection area or mesh using a plurality of mesh nodes or devices. In contrast to more traditional networks that utilize a relatively small number of hotspots/access points to connect devices to a network, a wireless mesh network provides connectivity by distributing connectivity, including broader network access, among many wireless mesh nodes in communication with one another. Thus, the mesh network may be used to share objects, e.g., data, files, pictures, video, audio, etc., among devices connected via the mesh network.

BRIEF SUMMARY

In summary, one aspect provides a method, comprising: establishing a connection between a first device and a second device, the first device thereby joining a mesh network to which the second device is connected; obtaining, at the first device, identifying information for a plurality of devices of the mesh network; accessing information accessible to the first device to determine a device ranking among the plurality of devices of the mesh network; after determining a ranking, obtaining information from a ranked device regarding objects available from the ranked device; and creating, using a processor, a list of available objects on the mesh network; wherein the list of available objects is ordered taking into account the objects available from the ranked devices.

Another aspect provides an information handling device, comprising: a processor; and a memory device storing instructions executable by the processor to: establish a connection between the information handling device and a second device, the information handling device thereby joining a mesh network to which the second device is connected; obtain identifying information for a plurality of devices of the mesh network; access information to determine a device ranking among the plurality of devices of the mesh network; after determining a ranking, obtain information from a ranked device regarding objects available from the ranked device; and create a list of available objects on the mesh network; wherein the list of available objects is ordered taking into account the objects available from the ranked devices.

A further aspect provides a program product, comprising: a storage medium comprising computer readable program code, the computer readable program code comprising: computer readable program code configured to establish a connection between a first device and a second device, the first device thereby joining a mesh network to which the second device is connected; computer readable program code configured to obtain, at the first device, identifying information for a plurality of devices of the mesh network; computer readable program code configured to access information accessible to the first device to determine a device ranking among the plurality of devices of the mesh network; computer readable program code configured to after determine a ranking, obtaining information from a ranked device regarding objects available from the ranked device; and computer readable program code configured to create, using a processor, a list of available objects on the mesh network; wherein the list of available objects is ordered taking into account the objects available from the ranked devices.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One of the benefits of a mesh network is access to the objects (e.g., data, files (e.g., video, music), etc.) across all devices actively part of the mesh network at a given moment in time. However, it can be time consuming to query all of the devices in the mesh network and build up a list of available objects. For example, following the joining of a mesh network, a device will typically begin to enumerate available objects (e.g., data, audio and video files, etc.) resident on the other devices in the mesh network and available to the joining device. Unfortunately, conventional methods of building up this list of available objects do not offer any form of intelligence to the enumeration process. For example, typically the object list is constructed based on nearest-neighbor or connectivity metric (e.g., device objects added in order of discovery), without taking into account any indication(s) of which devices or objects the joining user may want.

Accordingly, an embodiment queries mesh network devices for the most interesting devices or objects first, thereby speeding up the process of acquiring available objects that the user is likely to be most interested in.

The illustrated example embodiments will be best understood by reference to the figures. The following description is intended only by way of example, and simply illustrates certain example embodiments.

Figure 1:
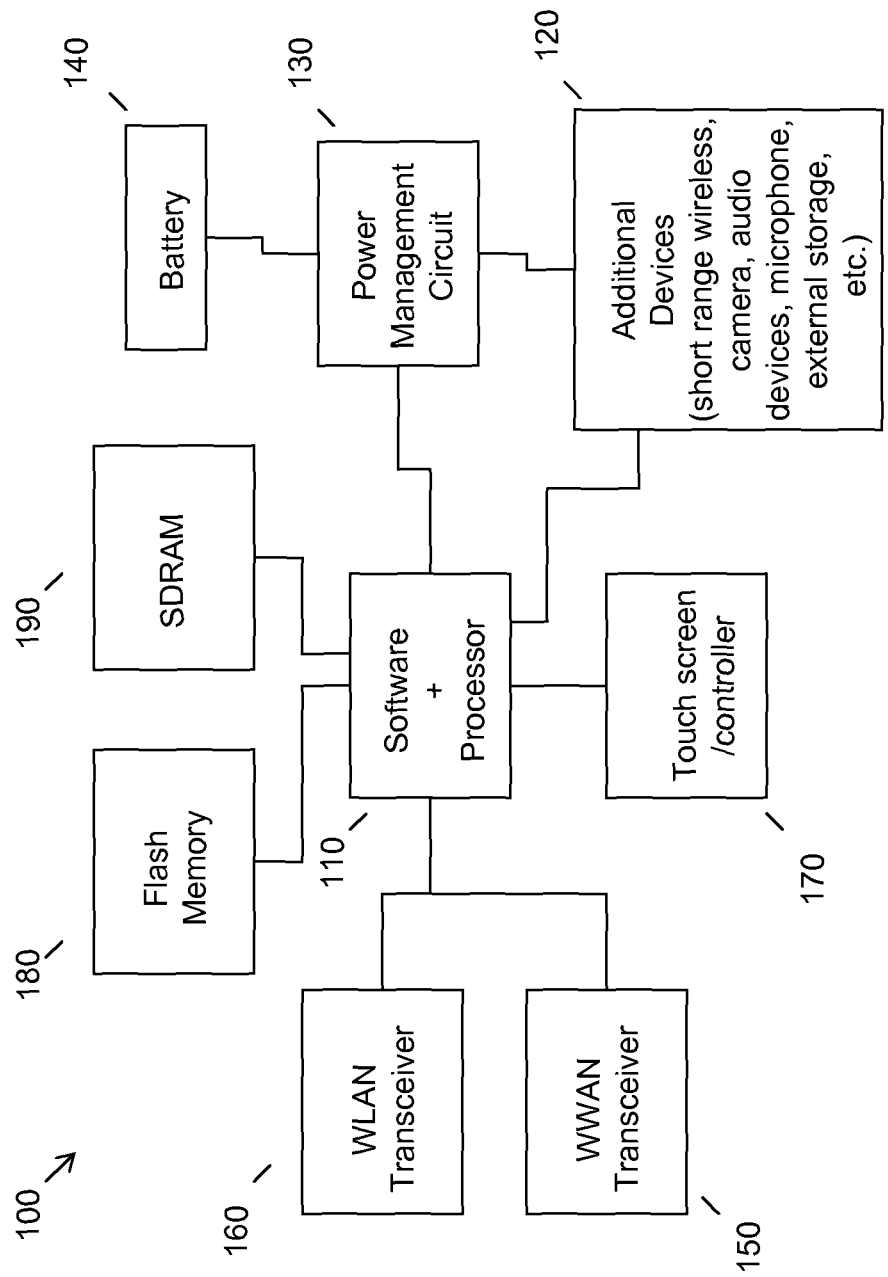
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces for example include SDIO and I2C.

There are power management chip(s) 130, e.g., a battery management unit, BMU, which manage power as supplied for example via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a short range wireless communication device, such as a BLUETOOTH radio that may be used for near field communications, e.g., among devices communicating via a mesh network arrangement. Commonly, system 100 will include a touch screen 170 for data input and display. System 100 also typically includes various memory devices, for example flash memory 180 and SDRAM 190.

Figure 2:
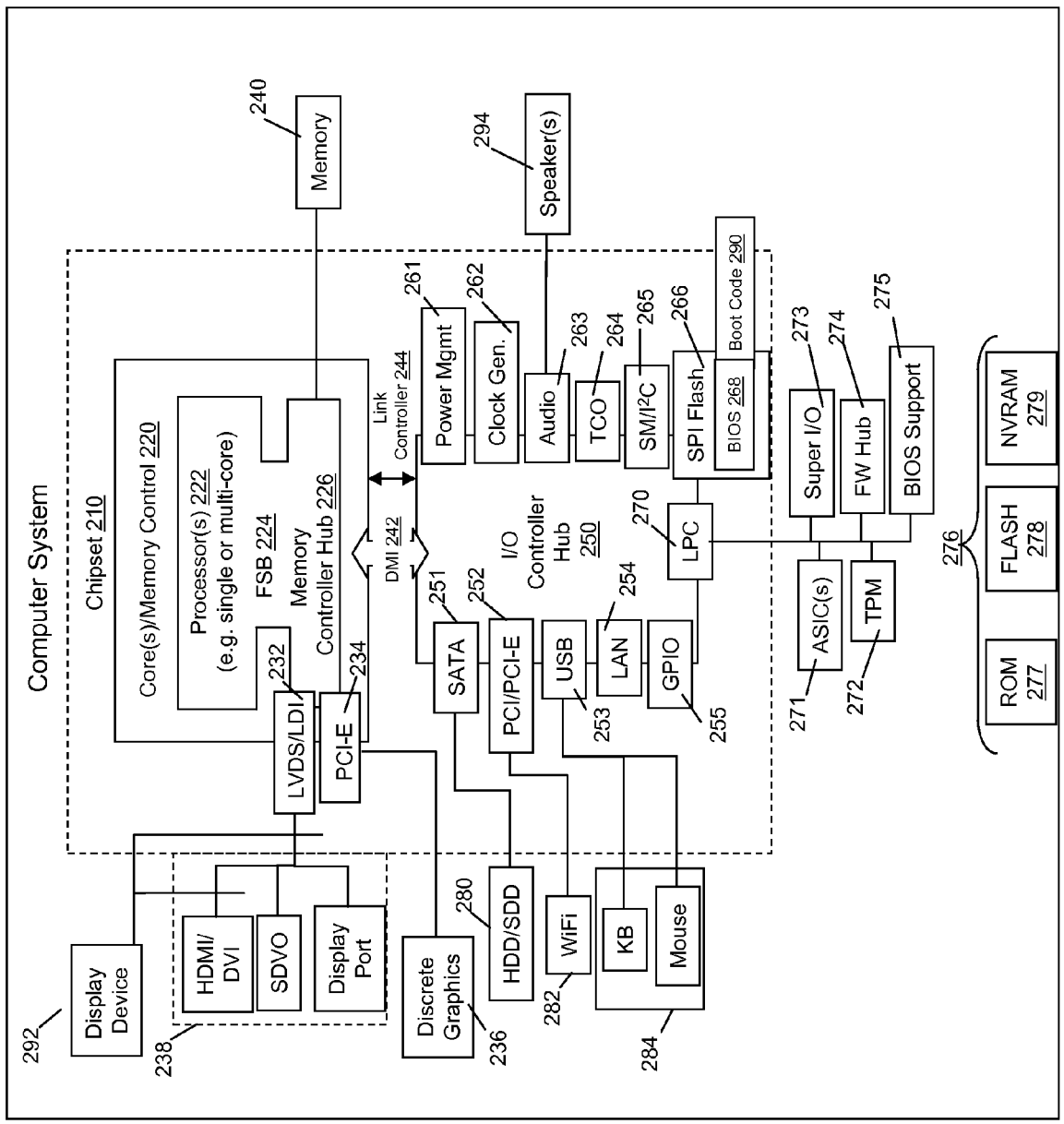
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). The architecture of the chipset 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, et cetera). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280 et cetera), a PCI-E interface 252 (for example, for wireless connections 282), a USB interface 253 (for example, for devices 284 such as a digitizer, keyboard, mice, cameras, phones, microphones, storage, other connected devices, et cetera), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Figure 3:
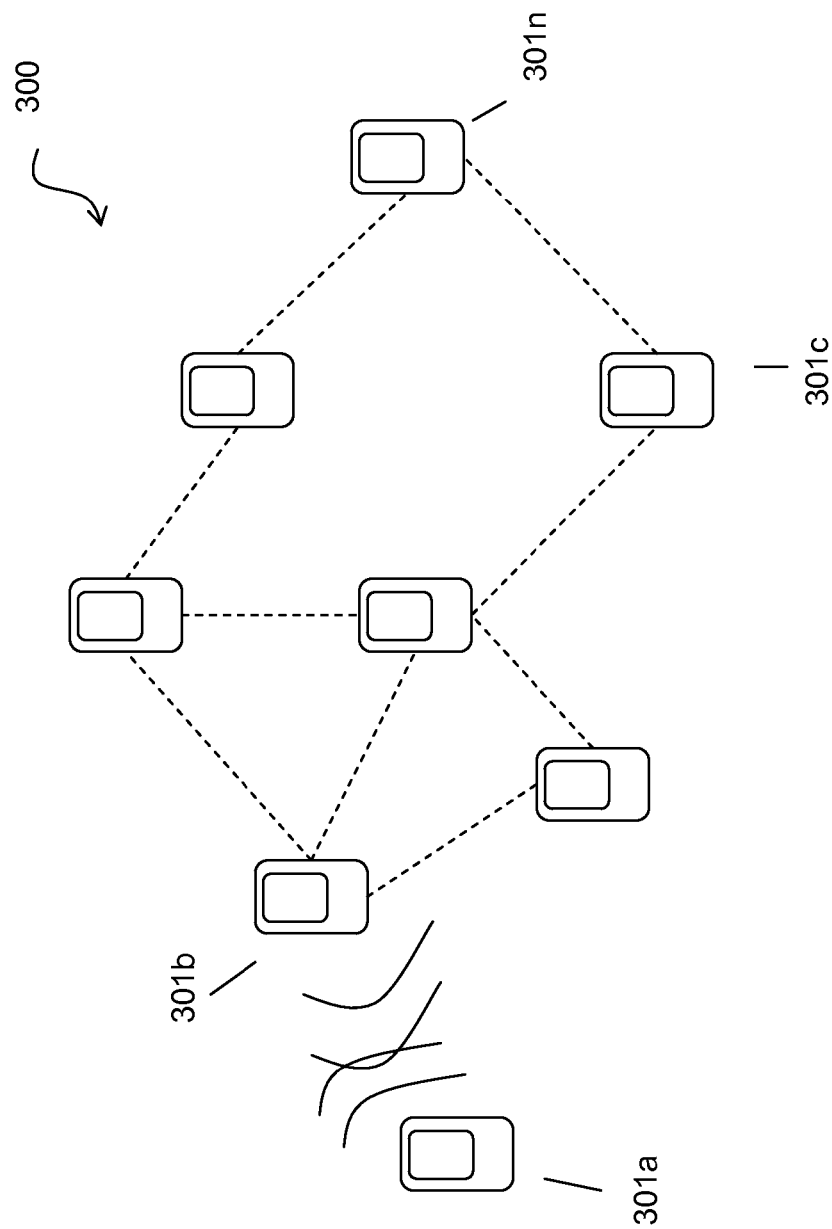
FIG. 3 illustrates an example mesh network.

Information handling device circuitry, as for example outlined in FIG. 1 or FIG. 2, may used in devices that join and form a mesh network, e.g., using near field communication. Accordingly, using such a device, a user may connect to other devices in the mesh network or "join" the mesh network. For example, in FIG. 3 a mesh network 300 is illustrated. A device 301a may join the mesh network by making contact with at least one other mesh network device, e.g., 301b. The contact or communication may be, e.g., via near field communication (NFC), personal area network (PAN), wireless local area network (WLAN), and/or wide area network (WAN). Responsive to establishing a connection between device 301a and 301b, device 301a may thus be joined to the mesh network by virtue of coordinated communications between the distributed devices 301a, 301b . . . 301n.

An embodiment provides a service that, responsive to joining such a mesh network 300, a device 3001a queries mesh network devices 301b . . . 301n in order to build up a list of available objects (e.g., data, files, etc.) available to device 301a. As described herein, an embodiment employs methods to intelligently identify, e.g., the most interesting devices or objects of the mesh network 300, such that the objects are added to the list first are ordered according to the inferred interest of the particular device, e.g., 301a, or user for which the list is being compiled. Thus, rather than simply waiting for a list of objects that is enumerated in a conventional fashion, e.g., nearest device's objects first, e.g., device 301b, the object list is populated with interesting objects first and thus the process of finding and obtaining interesting objects is sped up.

For example, it may be that for device 301a (or user thereof) the most interesting object(s) is/are located on device 301c, not any other devices of 301b . . . 301n of the mesh network 300. Conventionally, device 301b's objects might first populate device 301a's available object list followed by other devices, and eventually device 301c's objects would appear as available to device 301a.

Figure 4:
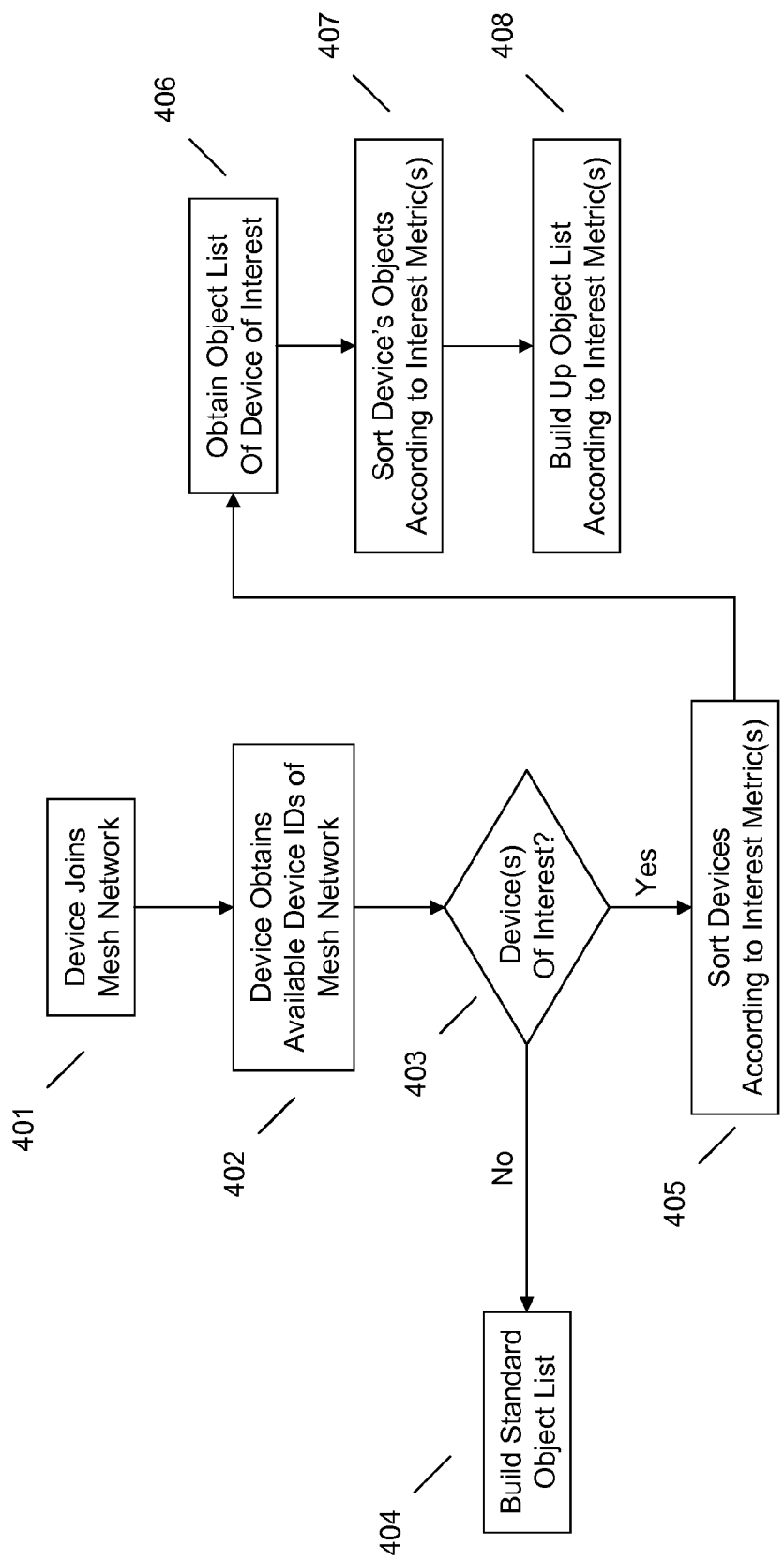
FIG. 4 illustrates an example method for intelligent mesh object buildup.

In contrast, according to an embodiment, an intelligence is build into the method of building up the object list of device 301a such that the most interesting object(s) is/are enumerated first, here an object on device 301c. In FIG. 4, examples how the intelligent list is built for device 301a are illustrated.

In FIG. 4, a device (e.g., device 301a) joins a mesh network (e.g., mesh network 300) at 401. The device may thus obtain at 402 the identities of other devices on the mesh network at the current time. For example, after device 301a communicates with device 301b to join the mesh network 300, device 301a will be able to identify other devices, 301b . . . 301n, on the mesh network 300 at the present time, including device 301c.

According to an embodiment, the device (e.g., device 301a) will then be able to determine if there is a device of interest, e.g., device 301c, in the mesh network at 403. In order to determine a device of interest (or multiple devices of interest), an embodiment may employ knowledge derived from a variety of sources, e.g., social networking information of device 301a, history of a device 301a, 301c, etc. An embodiment may then determine an ordering of which device (s) are of interest at 405. If no device of interest is identified, the object list may be build according to conventional techniques at 404.

Identifying a device of interest and sorting the devices accordingly allows an embodiment to thereafter identify objects from these devices first, such that objects of interest may be listed more quickly for the user, e.g., of device 301a. Thus, objects from a device or devices of interest, e.g., device 301c, may be identified first at 406 and used to build the object list at 408. Optionally, the object list obtained from the device of interest may be sorted again, e.g., using object level interest metric(s) at 407, to build up the object list at 408. For example, similar to identifying devices of interest, objects of interest may be identified. For example, it may be known that the user of the device 301a (for which the list is being compiled) frequently shares music files, and thus music files identified in an object list of device 301c may thus be ordered and listed first.

Referring back to step 403, it will be understood that there are a variety of techniques that may be utilized to identify a device of interest. For example, an embodiment may use various sources of information to define different circles of interest regarding devices of the mesh network. For example, an embodiment may utilize knowledge obtained from device 301a, e.g., device 301a contacts list or social networking information, information derived from a cloud account associated with device 301a, etc., in order to identify devices of interest.

For example, an embodiment may determine that device 301c is a device known to be a device of a friend or a family member (with respect to the device 301a) and thus device 301c would be queried first at 406 in order to identify available objects. Thus, for example, an embodiment queries "friends" first, then "family", then "work" or "school", etc. These relations or metrics of interest may be thought of circles, e.g., a friends circle, family circle, etc. Of course there are may be many devices within each circle. Thus, an embodiment may iterate through the process of determining a device of interest at 403 a number of times to refine the determination, e.g., using additional metrics such as historical information regarding device interactions, etc.

For example, in order for an embodiment to determine the order within a circle, an embodiment may utilize another interest metric, e.g., past history of contact with the device and/or past history of contact with the device owner (e.g., where a device owner has a new device which may be discovered, e.g., via an account association, the new device may likewise contains objects of interest migrated from the previous device), in order to arrange or sort the devices within the circle to order higher in the list the device(s) that in the past the user has most borrowed objects from. Similarly, the devices of interest may be ordered according to history of the devices themselves, e.g., device 301c is known to share objects with a mesh network more than device 301b, thus device 301c is promoted higher in the list.

Additional steps may thus be included at 403. For example, an embodiment may automatically query the user of the device, e.g., 301a, if a suggested change in the automatic ordering of step 403 is recommended. For example, an initial determination of devices of interest at 403 may order a particular device low in the "friends" circle, but an embodiment may additionally determine that the particular device with an initially low ordering also has a heavy past history of object sharing, e.g., with the user of the device 301a and/or other devices. Thus, an embodiment may suggest bumping that device to a higher level in the ordering. A user of the device 301a may confirm this suggestion or decline it.

Thus, when entering a mesh network 300 an embodiment builds the object list in such a way that the most desired or interesting objects are found first and listed. An embodiment may also use this method to constantly or frequently update the objects list while the device is in the mesh network. An embodiment may repeat the ordering or sorting of the list given updates/changes in the mesh network and/or objects selected from the list. For example, as a device, e.g., 301a, selects an object from the list and obtains it, the remaining objects on the list are re-ordered and this event may be logged for later use, e.g., as an indication of interest in the particular object type, an interest in the particular device (type or identity) from which the object was obtained, etc. Thus, an embodiment promotes more "interesting" objects to a higher position within the list, speeding up the process of listing available objects in the mesh network. As will be appreciated, this is quite useful as there are potentially hundreds or thousands of available objects on a mesh network, thus intelligently ordering of an object list is highly desirable.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   establishing a connection between a first device and a second device, the first device thereby joining a mesh network to which the second device is connected;
   obtaining, at the first device, identifying information for a plurality of devices of the mesh network;
   accessing information accessible to the first device to determine a device ranking among the plurality of devices of the mesh network;
   after determining a ranking, obtaining information from a ranked device regarding objects available from the ranked device, wherein the ranked device comprises a plurality of ranked devices;
   organizing the ranked devices into groups;
   ordering the groups; and
   creating, using a processor, a list of available objects on the mesh network;
   wherein the list of available objects is ordered taking into account the objects available from the ranked devices.

2. The method of claim 1, wherein the information accessible to the first device to determine a ranking among the plurality of devices of the mesh network comprises social network information.

3. The method of claim 1, wherein the information accessible to the first device to determine a ranking among the plurality of devices of the mesh network comprises mesh device user information.

4. The method of claim 1, wherein the information accessible to the first device to determine a ranking among the plurality of devices of the mesh network comprises contacts of the first device.

5. The method of claim 1, wherein the groups are ordered using information selected from the group of information consisting of social network information, mesh device user information, contacts of the first device, and a history of a device of the mesh network sharing objects.

6. The method of claim 1, further comprising ordering objects available from the ranked devices using object ordering information available to the first device.

7. The method of claim 6, wherein the object ordering information includes information derived from the first device regarding an object type previously obtained via mesh network sharing.

8. An information handling device, comprising:
   a processor; and
   a memory device storing instructions executable by the processor to:
   establish a connection between the information handling device and a second device, the information handling device thereby joining a mesh network to which the second device is connected;
   obtain identifying information for a plurality of devices of the mesh network;
   access information to determine a device ranking among the plurality of devices of the mesh network;
   after determining a ranking, obtain information from a ranked device regarding objects available from the ranked device, wherein the ranked device comprises a plurality of ranked devices;
   organize the ranked devices into groups;
   order the groups; and
   create a list of available objects on the mesh network;
   wherein the list of available objects is ordered taking into account the objects available from the ranked devices.

9. The information handling device of claim 8, wherein the information accessible to the information handling device to determine a ranking among the plurality of devices of the mesh network comprises social network information.

10. The information handling device of claim 8, wherein the information accessible to the information handling device to determine a ranking among the plurality of devices of the mesh network comprises mesh device user information.

11. The information handling device of claim 8, wherein the information accessible to the information handling device to determine a ranking among the plurality of devices of the mesh network comprises contacts of the information handling device.

12. The information handling device of claim 8, wherein the groups are ordered using information selected from the group of information consisting of social network information, mesh device user information, contacts of the information handling device, and a history of a device of the mesh network sharing objects.

13. The information handling device of claim 8, the instructions being further executable by the processor to order objects available from the ranked devices using object ordering information available to the information handling device.

14. A program product, comprising:
a storage device comprising computer readable program code, the computer readable program code comprising:
computer readable program code that establishes a connection between a first device and a second device, the first device thereby joining a mesh network to which the second device is connected;
computer readable program code that obtains, at the first device, identifying information for a plurality of devices of the mesh network;
computer readable program code that accesses information accessible to the first device to determine a device ranking among the plurality of devices of the mesh network;
computer readable program code that, after determining a ranking, obtains information from a ranked device regarding objects available from the ranked device, wherein the ranked device comprises a plurality of ranked devices;
computer readable program code that organizes the ranked devices into groups;
computer readable program code that orders the groups; and
computer readable program code that creates, using a processor, a list of available objects on the mesh network;
wherein the list of available objects is ordered taking into account the objects available from the ranked devices.

15. The information handling device of claim 13, wherein the object ordering information includes information derived from the information handling device regarding an object type previously obtained via mesh network sharing.

16. A method, comprising:
establishing a connection between a first device and a second device, the first device thereby joining a mesh network to which the second device is connected;
obtaining, at the first device, identifying information for a plurality of devices of the mesh network;
accessing information accessible to the first device to determine a device ranking among the plurality of devices of the mesh network, wherein the information accessible to the first device to determine a ranking among the plurality of devices on the mesh network comprises information regarding a history of a device of the mesh network sharing objects;
after determining a ranking, obtaining information from a ranked device regarding objects available from the ranked device; and
creating, using a processor, a list of available objects on the mesh network;
wherein the list of available objects is ordered taking into account the objects available from the ranked devices.

17. The method of claim 16, wherein the information accessible to the first device to determine a ranking among the plurality of devices of the mesh network comprises social network information.

18. The method of claim 16, wherein the information accessible to the first device to determine a ranking among the plurality of devices of the mesh network comprises mesh device user information.

19. The method of claim 16, wherein the information accessible to the first device to determine a ranking among the plurality of devices of the mesh network comprises contacts of the first device.

20. The method of claim 16, wherein the groups are ordered using information selected from the group of information consisting of social network information, mesh device user information, contacts of the first device, and a history of a device of the mesh network sharing objects.

21. The method of claim 16, further comprising ordering objects available from the ranked devices using object ordering information available to the first device.

22. The method of claim 21, wherein the object ordering information includes information derived from the first device regarding an object type previously obtained via mesh network sharing.

23. An information handling device, comprising:
a processor; and
a memory device storing instructions executable by the processor to:
establish a connection between the information handling device and a second device, the information handling device thereby joining a mesh network to which the second device is connected;
obtain identifying information for a plurality of devices of the mesh network;
access information to determine a device ranking among the plurality of devices of the mesh network, wherein the information accessible to the information handling device to determine a ranking among the plurality of devices on the mesh network comprises information regarding a history of a device of the mesh network sharing objects;
after determining a ranking, obtain information from a ranked device regarding objects available from the ranked device; and
create a list of available objects on the mesh network;
wherein the list of available objects is ordered taking into account the objects available from the ranked devices.

24. The information handling device of claim 23, wherein the information accessible to the information handling device to determine a ranking among the plurality of devices of the mesh network comprises social network information.

25. The information handling device of claim 23, wherein the information accessible to the information handling device to determine a ranking among the plurality of devices of the mesh network comprises mesh device user information.

26. The information handling device of claim 23, wherein the information accessible to the information handling device to determine a ranking among the plurality of devices of the mesh network comprises contacts of the information handling device.

27. The information handling device of claim 23, wherein the groups are ordered using information selected from the group of information consisting of social network information, mesh device user information, contacts of the information handling device, and a history of a device of the mesh network sharing objects.

28. The information handling device of claim 23, the instructions being further executable by the processor to order objects available from the ranked devices using object ordering information available to the information handling device.

29. The information handling device of claim 28, wherein the object ordering information includes information derived from the information handling device regarding an object type previously obtained via mesh network sharing.

\* \* \* \* \*